United States Patent
Joung et al.

(10) Patent No.: US 7,616,193 B2
(45) Date of Patent: Nov. 10, 2009

(54) HUMAN INPUT APPARATUS WITH TOUCH SENSORS AND METHOD FOR CALCULATING MOVEMENT VALUE THEREOF

(75) Inventors: Chul-Yong Joung, Seoul (KR);
Jae-Surk Hong, Yongin-si (KR);
Bang-Won Lee, Yongin-si (KR);
Young-Ho Shin, Yongin-si (KR)

(73) Assignee: ATLab Inc. (KR)

( * ) Notice: Subject to any disclaimer, the term of this patent is extended or adjusted under 35 U.S.C. 154(b) by 634 days.

(21) Appl. No.: 11/245,399

(22) Filed: Oct. 6, 2005

(65) Prior Publication Data
US 2006/0077176 A1   Apr. 13, 2006

(30) Foreign Application Priority Data
Oct. 7, 2004   (KR)   ............ 10-2004-0080075

(51) Int. Cl.
*G06F 3/041*   (2006.01)
(52) U.S. Cl. .................................. 345/173
(58) Field of Classification Search .......... 345/173–178
See application file for complete search history.

(56) References Cited

U.S. PATENT DOCUMENTS 6,278,443 B1    8/2001   Armo et al.
6,650,320 B1 *  11/2003  Zimmerman ............. 345/179
7,030,860 B1 *  4/2006   Hsu et al. .................. 345/173

FOREIGN PATENT DOCUMENTS

CA    2353159 A1    1/2003
TW    587160        5/2004

OTHER PUBLICATIONS

Taiwan Office Action dated Sep. 23, 2008 to corresponding Taiwan Patent Application No. 94134925.

* cited by examiner

*Primary Examiner*—Amr Awad
*Assistant Examiner*—Randal Willis
(74) *Attorney, Agent, or Firm*—Cantor Colburn LLP (57) ABSTRACT

Provided is a human input apparatus and method for calculating a movement value thereof. The human input apparatus includes a plurality of touch sensors for varying and outputting output signals by direct contact, a sensing unit for receiving the output signals in parallel from the plurality of touch sensors and generating input data in response to the output signals, and a movement value calculating means for extracting valid input data from the input data and operating on and outputting a movement value using operated-on data comparing the valid input data with reference data and the reference data. Accordingly, a mechanical device mounted on the human input apparatus in order to express movement can be replaced by an electronic device employing the touch sensors, so that it is possible not only to prevent malfunction caused by noise or abrasion of a mechanical switch, but also to reduce power consumption and production cost. Further, it is advantageous for downsizing.

54 Claims, 7 Drawing Sheets

|     | MSB |   |   |   |   |   |   | LSB |
|-----|---|---|---|---|---|---|---|---|
| (a) | 0 | 0 | 1 | 1 | 1 | 0 | 0 | 0 |
| (b) | 0 | 0 | 0 | 1 | 1 | 1 | 0 | 0 |
| (c) | 0 | 0 | 1 | 0 | 0 | 1 | 0 | 0 |

|     | MSB |   |   |   |   |   |   | LSB |
|-----|---|---|---|---|---|---|---|---|
| (a) | 0 | 0 | 1 | 1 | 1 | 0 | 0 | 0 |
| (b) | 0 | 1 | 1 | 1 | 0 | 0 | 0 | 0 |
| (c) | 0 | 1 | 0 | 0 | 1 | 0 | 0 | 0 |

|     | MSB |   |   |   |   |   |   | LSB |
|-----|---|---|---|---|---|---|---|---|
| (a) | 0 | 0 | 1 | 1 | 1 | 0 | 0 | 0 |
| (b) | 0 | 0 | 0 | 1 | 1 | 1 | 1 | 0 |
| (c) | 0 | 0 | 1 | 0 | 0 | 1 | 1 | 0 |

|     | 7 | 6 | 5 | 4 | 3 | 2 | 1 | 0 |
|-----|---|---|---|---|---|---|---|---|
| (a) | 0 | 0 | 1 | 1 | 1 | 0 | 0 | 0 |

Rup=5  Rdw=3

|     |   |   |   |   |   |   |   |   |
|-----|---|---|---|---|---|---|---|---|
| (b) | 0 | 0 | 0 | 1 | 1 | 1 | 1 | 0 |

Iup=4  Idw=1

HUMAN INPUT APPARATUS WITH TOUCH SENSORS AND METHOD FOR CALCULATING MOVEMENT VALUE THEREOF

CROSS-REFERENCE TO RELATED APPLICATION

This application claims the benefit of Korean Patent Application No. 2004-80075, filed on Oct. 7, 2004, the disclosure of which is hereby incorporated herein by reference in its entirety.

BACKGROUND OF THE INVENTION

1. Field of the Invention

The present invention relates to a human input apparatus and a method for calculating a movement value thereof, and more particularly, to a human input apparatus with touch sensors and a method for calculating a movement value thereof.

2. Description of the Related Art

A human input apparatus moves a cursor across a screen or causes displayed text or graphics to move up, down, or across the screen in response to manipulation by the hand of a user. For example, a computer mouse moves a cursor across a screen in response to movement of the mouse itself, or scrolls text or images displayed on the screen using a separate scroll device. In the case of a mobile phone, when the user operates a human input apparatus composed of buttons etc., the human input apparatus moves a cursor on the screen or scrolls the information displayed on the screen.

Conventionally, movement sensing devices are generally mounted, for example, on the mouse in order to scroll text or images on the screen. One example of such movement sensing devices is a wheel scroll device, which is composed of a mixture of electrical and mechanical elements. When the user moves a wheel projecting from the mouse, the wheel scroll device senses movement of the wheel using a mechanical switch or a light source and photo sensor to calculate a value of the movement.

However, in the former case, noise is generated from a contact of the mechanical switch, or the mechanical switch is subject to abrasion and eventually malfunctions. In the latter case, power consumption increases due to driving of the light source, and production cost increases due to addition of the light source and photo sensor. Further, the switch used in the mobile phone is also subject to abrasion, and the longer it is used, the greater the danger of malfunctioning will be.

SUMMARY OF THE INVENTION

It is an objective of the present invention to provide a human input apparatus with touch sensors that consumes low power, can be produced at low cost, and is free of mechanical abrasion.

It is another objective to provide a method for calculating a movement value of the human input apparatus.

According to an aspect of the present invention, there is provided a human input apparatus including: a plurality of touch sensors for updating and outputting output signals by direct contact; a sensing unit for receiving the output signals in parallel from the plurality of touch sensors and outputting input data in response to the output signals; and a movement value calculating means for extracting valid input data from the input data and operating on and outputting a movement value using operated-on data comparing the valid input data with reference data and the reference data.

The movement value calculating means may include: a valid input extractor for receiving the input data to determine whether the input data is valid or not and extracting and outputting the valid input data; reference data storage for storing the reference data; a movement value operator for operating on the movement value using the operated-on data and the reference data; and an output unit for outputting the movement value.

The operated-on data may be obtained by an exclusive-OR (XOR) operation of the valid input data and the reference data.

The movement value operator may include: a changing contact position detecting function of performing an exclusive-OR (XOR) operation on the valid input data and the reference data and outputting the operated-on data; a movement validity determining function of determining that movement is valid when "1" bits of the operated-on data are two or more in number and when bits of the reference data which correspond to the "1" bits of the operated-on data all are not identical; a movement magnitude operating function of, when determining that the movement is valid, detecting first and second values that correspond to numbers of "1" and "0" bits respectively among the bits of the reference data which correspond to the "1" bits of the operated-on data, and outputting either one of the first and second values as a movement magnitude; and a movement direction setting function of setting a movement direction depending on whether or not a first bit that is the bit of the reference data which corresponds to a most significant bit of the "1" bits of the operated-on data has the same value as a second bit that is the bit of the reference data which corresponds to a bit adjacent to the most significant bit of the "1" bits of the operated-on data.

The movement value operator may determine that the second bit indicates that the touch sensor is out of contact when the most significant bit of the "1" bits of the operated-on data is the most significant bit of the operated-on data, and may set the movement direction.

According to another aspect of the present invention, there is provided a human input apparatus including: a plurality of touch sensors for updating and outputting output signals by direct contact; a sensing unit for receiving the output signals in parallel from the plurality of touch sensors and outputting input data in response to the output signals; and a movement value calculating means for extracting valid input data from the input data and calculating and outputting a movement value using input data upper and lower points that are most and least significant bits of the valid input data indicating that the touch sensors are in contact and reference data upper and lower points that are most and least significant bits of the reference data indicating that the touch sensors are in contact.

The movement value calculating means may include: a valid input extractor for receiving the input data to determine whether the input data is valid or not, and extracting and outputting the valid input data; reference data storage for storing the reference data; a movement value operator for operating on the movement value using the input data upper point, the input data lower point, the reference data upper point and the reference data lower point; and an output unit for outputting the movement value.

The movement value operator may include: a changing contact position detecting function of detecting the input data upper point, the input data lower point, the reference data upper point and the reference data lower point; a movement validity determining function of calculating a first value of subtracting the input data upper point from the reference data upper point and a second value of subtracting the input data lower point from the reference data lower point and determining that movement is valid when signs of the first and second values are not different from each other; a movement magnitude operating function of outputting either one of an absolute value of the first value and an absolute value of the second value as a movement magnitude; and a movement direction setting function of setting a movement direction depending on the sign of the first value.

The movement value operator may set the movement direction depending on the sign of the second value when the first value is 0.

In the human input apparatuses according to both of the above aspects of the present invention, the valid input extractor may output the input data as the valid input data when the input data does not change for a predetermined time, or when contact indication bits indicating that the touch sensors are in contact are continuous in the input data.

Meanwhile, the valid input extractor may adjust the input data when contact indication bits indicating that the touch sensors are in contact are not continuous in the input data to make the contact indication bits continuous, and output the adjusted data as the valid input data.

Also, the valid input extractor may output the valid input data when the valid input data is not identical to the reference data.

In the human input apparatuses according to both of the above aspects of the present invention, the movement value calculating means may output the movement value when the valid input data is identical to the reference data and when contact indication bits indicating that the touch sensors are in contact include the most or least significant bit in the valid input data, in the same manner as the contact indication bits continue to move in a constant direction.

Meanwhile, the movement value calculating means may update only the reference data into the valid input data without operating on or outputting the movement value when either one of the valid input data and the reference data indicates that all the touch sensors are out of contact.

Also, the movement value operator may output a predetermined maximum magnitude as the movement magnitude when the movement magnitude is larger than the predetermined maximum magnitude.

In the human input apparatus according to both of the above aspects of the present invention, the human input apparatus may scroll an image or a text on a screen using the movement value.

According to yet another aspect of the present invention, there is provided a method for calculating a movement value of a human input apparatus including a plurality of touch sensors for varying and outputting output signals by direct contact and a sensing unit for receiving the output signals in parallel from the plurality of touch sensors and outputting input data in response to the output signals. The method comprises: a valid input data extracting step of receiving the input data to determine whether or not the input data is valid and outputting valid input data; a movement value operating step of operating on the movement value using operated-on data comparing the valid input data with reference data and the reference data; a reference data changing step of changing the reference data into the valid input data; and a movement value outputting step of outputting the movement value.

The operated-on data may be obtained by an exclusive-OR (XOR) operation of the valid input data and the reference data.

The movement value operating step may include: a changing contact position detecting sub-step of performing an exclusive-OR (XOR) operation on the valid input data and the reference data and outputting the operated-on data; a movement validity determining sub-step of determining that movement is valid when "1" bits of the operated-on data are two or more in number and when bits of the reference data which correspond to the "1" bits of the operated-on data all are not identical; a movement magnitude operating sub-step of, when determining that the movement is valid, detecting first and second values that correspond to numbers of "1" and "0" bits respectively among the bits of the reference data which correspond to the "1" bits of the operated-on data, and outputting either one of the first and second values as a movement magnitude; and a movement direction setting sub-step of setting a movement direction depending on whether or not a first bit that is the bit of the reference data which corresponds to a most significant bit of the "1" bits of the operated-on data has the same value as a second bit that is the bit of the reference data which corresponds to a bit adjacent to the most significant bit of the "1" bits of the operated-on data.

The movement direction setting sub-step may determine that the second bit indicates that the touch sensor is out of contact when the most significant bit of the "1" bits of the operated-on data is the most significant bit of the operated-on data, and set the movement direction.

According to still another aspect of the present invention, there is provided a method for calculating a movement value of a human input apparatus including a plurality of touch sensors for varying and outputting output signals by direct contact and a sensing unit for receiving the output signals in parallel from the plurality of touch sensors and outputting input data in response to the output signals. The method comprises: a valid input data extracting step of receiving the input data to determine whether or not the input data is valid and outputting valid input data; a movement value operating step of operating on the movement value from input data upper and lower points that are most and least significant bits of the valid input data indicating that the touch sensors are in contact and from reference data upper and lower points that are most and least significant bits of the reference data indicating that the touch sensors are in contact; a reference data changing step of changing the reference data into the valid input data; and a movement value outputting step of outputting the movement value.

The movement value operating step may include: a changing contact position detecting sub-step of detecting the input data upper point, the input data lower point, the reference data upper point and the reference data lower point; a movement validity determining sub-step of calculating a first value of subtracting the input data upper point from the reference data upper point and a second value of subtracting the input data lower point from the reference data lower point and determining that movement is valid when signs of the first and second values are not different from each other; a movement magnitude operating sub-step of outputting either one of an absolute value of the first value and an absolute value of the second value as a movement magnitude; and a movement direction setting sub-step of setting a movement direction depending on the sign of the first value.

The movement direction setting sub-step may set the movement direction depending on the sign of the second value when the first value is 0.

In the method for calculating the movement value of the human input apparatus according to both of the above aspects of the present invention, the valid input data extracting step may output the input data as the valid input data when the input data does not change for a predetermined time, or when contact indication bits indicating that the touch sensors are in contact are continuous in the input data.

Meanwhile, the valid input data extracting step may adjust the input data when contact indication bits indicating that the touch sensors are in contact are not continuous in the input data to make the contact indication bits continuous, and output the adjusted data as the valid input data.

Also, the valid input data extracting step may output the valid input data when the valid input data is not identical to the reference data.

According to the first and second aspects of the method for calculating the movement value of the human input apparatus of the present invention, the method for calculating the movement value may output the movement value when the valid input data is identical to the reference data and when contact indication bits indicating that the touch sensors are in contact include the most or least significant bit in the valid input data, in the same manner as the contact indication bits continue to move in a constant direction.

In the method for calculating the movement value of the human input apparatus according to both of the above aspects of the present invention, the method for calculating the movement value may perform only the reference data changing step without performing the movement value operating step and the movement value outputting step when either one of the valid input data and the reference data indicates that all the touch sensors are out of contact.

Here, the movement magnitude operating sub-step may output a predetermined maximum magnitude as the movement magnitude when the movement magnitude is larger than the predetermined maximum magnitude.

The movement magnitude operating sub-step may output the result of multiplying the movement magnitude by a predetermined coefficient.

Here, the coefficient may be a number obtained by dividing a pixel number for a size of an icon on a screen by an integer.

In the method for calculating the movement value of the human input apparatus according to both of the above aspects of the present invention, the method may further comprise a movement speed sensing step of measuring a time until the valid input data changes and sensing a movement speed. The coefficient may be set in proportion to the movement speed.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIGS. 11 to 15 are views for explaining a first exemplary embodiment of a step of operating on a movement value in a method for calculating a movement value according to the present invention; in which

DETAILED DESCRIPTION OF THE INVENTION

Hereinafter, the present invention will be described in more detail with reference to the accompanying drawings, in which exemplary embodiments of a human input apparatus with touch sensors and a method for calculating a movement value thereof according to the present invention are shown.

Figure 1:
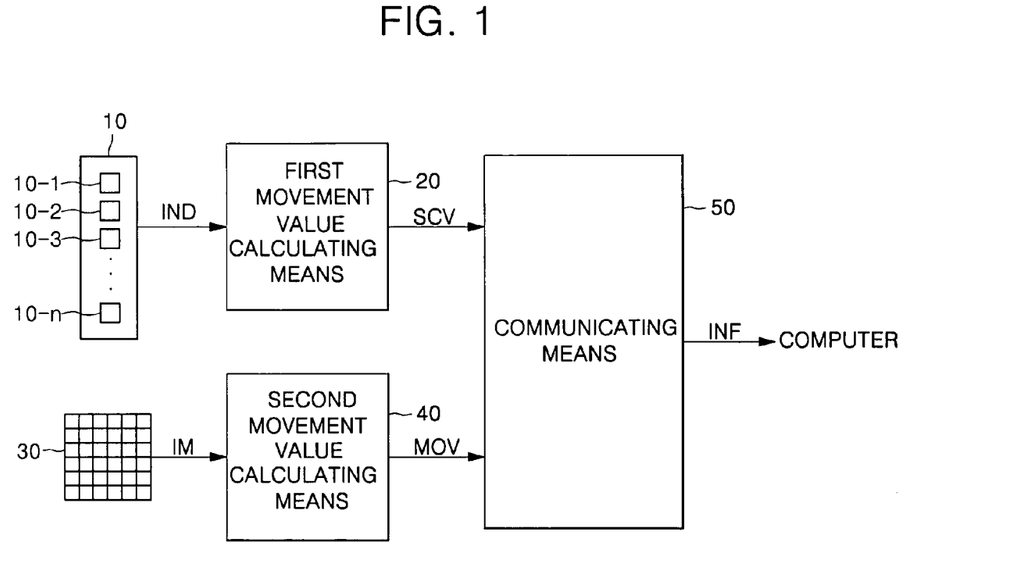
FIG. 1 is a block diagram of a mouse with touch sensors which is an exemplary embodiment of a human input apparatus of the present invention.

FIG. 1 shows an exemplary embodiment of a human input apparatus of the present invention, and more particularly, is a block diagram of a mouse on which a movement sensing device employing touch sensors is mounted, wherein the human input apparatus is composed of a sensing unit 10 having a plurality of touch sensors 10-1, 10-2 . . . 10-$n$, a first movement value calculating means 20, an image sensor 30, a second movement value calculating means 40, and a communicating means 50.

The function of each block shown in FIG. 1 will be described below.

Each of the touch sensors 10-1, 10-2 . . . 10-$n$ outputs a signal having a value of "0" or "1" based on contact information. Here, the touch sensors 10-1, 10-2 . . . 10-$n$ vary and output signals by direct contact. The use of such touch sensors activated by direct contact is advantageous for downsizing.

The sensing unit 10 detects the touch signals in parallel from the touch sensors 10-1, 10-2 . . . 10-$n$ to output input data IND in response to the output signals. In order words, the sensing unit 10 outputs the input data IND based on information on contacts of the touch sensors 10-1, 10-2 . . . 10-$n$. The first movement value calculating means 20 calculates and outputs a first movement value SCV which has both magnitude and direction, in response to the input data IND. In general, systems employing a mouse use the first movement value SCV to scroll displayed text or images on a screen.

The image sensor 30 senses the image of a working surface to output an image signal IM. The second movement value calculating means 40 calculates and outputs a second movement value MOV. In general, systems employing a mouse use the second movement value MOV to move a cursor on a screen.

The communicating means 50 responds to the first and second movement values SCV and MOV to output movement information INF to external equipment such as a computer, etc. While not shown, the human input device may be further provided with other inputting means such as buttons, etc.

Figure 2:
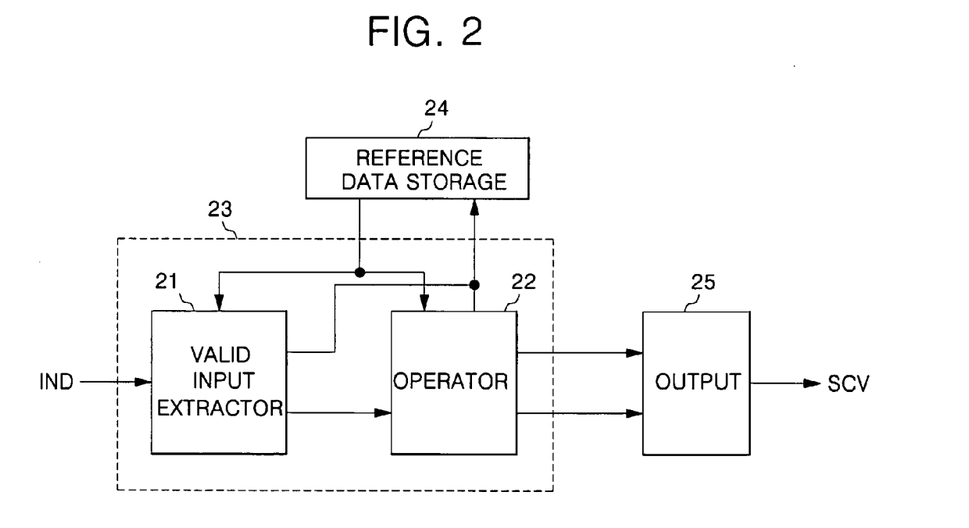
FIG. 2 is a block diagram of a first movement value calculating means of a human input apparatus of the present invention.

FIG. 2 is a block diagram of a first movement value calculating means 20 in an exemplary embodiment of a human input apparatus of the present invention shown in FIG. 1, wherein the first movement value calculating means 20 is composed of a controller 23 having a valid input extractor 21 and operator 22, reference data storage 24, and an output unit 25.

The function of each block shown in FIG. 2 will be described below.

The controller 23 determines whether or not the input data IND from the sensing unit 10 is valid input data, and if so, performs an operation of a movement magnitude and setting of a movement direction using the valid input data and reference data.

The valid input extractor 21 determines whether or not the input data IND input from the sensing unit 10 is valid input data, extracts the valid input data, and outputs the valid input data to the operator 22 or the reference data storage 24. Specifically, if the valid input data or reference data indicates that any touch sensor is in contact, the valid input extractor 21 outputs the valid input data to the reference data storage 24. If the valid input data is not identical to the reference data and if the valid input data or reference data indicates that no touch sensor is in contact, the valid input extractor 21 outputs the valid input data to the operator 22. If the input data IND is invalid, the valid input extractor 21 may be designed to adjust and output the input data IND.

Further, while not shown, in a certain case, the valid input extractor 21 may be designed to directly output the first movement value SCV without aid of the operator 23 to the output unit 25. For example, if both the reference data and the valid input data are identical and include a most or least significant bit, the valid input extractor 21 may be designed to output the first movement value in the same manner as moving with a constant movement magnitude in a specific direction.

The operator 22 performs an operation to calculate the movement magnitude and to determine the movement direction using both the valid input data output from the valid input extractor 21 and the reference data output from the reference data storage 24. Then, the operator 22 outputs both the movement magnitude and movement direction to the output unit 25 and simultaneously outputs the valid input data to the reference data storage 24.

The output unit 25 outputs the first movement value SCV in response to the movement magnitude and movement direction.

Figure 3:
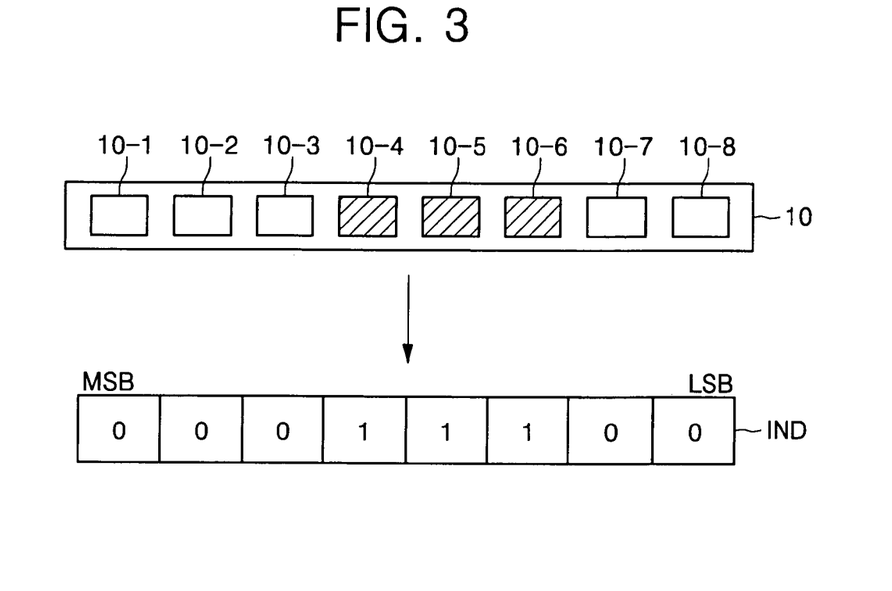
FIG. 3 is a view for explaining input data based on a contact state of touch sensors of a sensing unit shown in FIG. 1.

FIG. 3 illustrates input data IND based on contact information of touch sensors of a sensing unit 10, wherein the sensing unit 10 has eight touch sensors 10-1, 10-2 . . . 10-8. Among the touch sensors 10-1, 10-2 . . . 10-8 shown in FIG. 3, ones ("1"s) containing diagonal lines are contacted touch sensors and the others ("0"s) are non-contacted touch sensors.

Input data IND that is output on the basis of contact information of the touch sensors 10-1, 10-2 . . . 10-8 will be described below with reference to FIG. 3.

Bits constituting the input data IND of FIG. 3 represent output values of the touch sensors 10-1, 10-2 . . . 10-8, respectively. In other words, each bit indicates whether the corresponding touch sensor is in contact or not. Thus, if the sensing unit 10 is made up of eight touch sensors, then the input data IND amounts to 8 bits or 1 byte.

Hereafter, it is assumed that each of the touch sensors 10-1, 10-2 . . . 10-8 outputs a binary "1" when in contact and a binary "0" when not in contact. In FIG. 3, among the touch sensors 10-1, 10-2 . . . 10-8, the contacted ones 10-4, 10-5 and 10-6 output "1," and the others 10-1, 10-2, 10-3, 10-7 and 10-8 output "0." Thus, the input data IND has a bit stream "00011100" as shown in FIG. 3.

Figure 4:
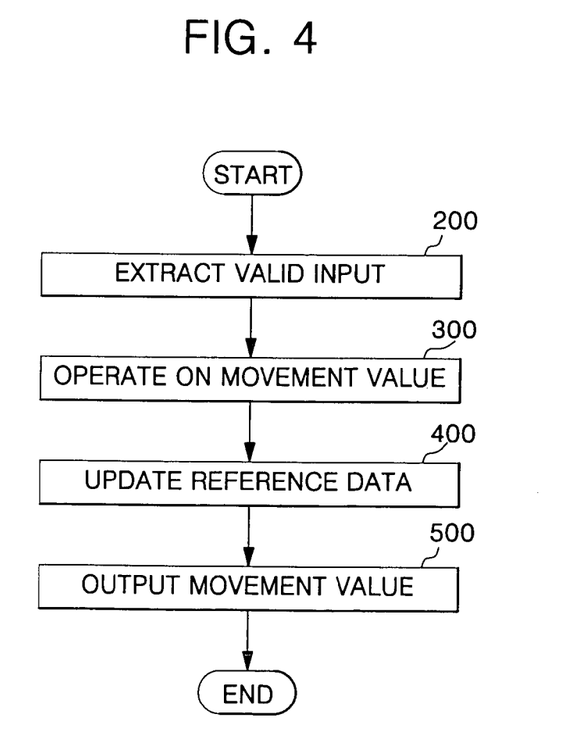
FIG. 4 is a flowchart for explaining a method for calculating a movement value of a human input apparatus according to the present invention.

FIG. 4 is a flowchart for explaining a method for calculating a movement value according to the present invention. The method will be described below with reference to FIG. 4.

In order to calculate a movement value, first, the valid input extractor 21 determines whether input data IND is valid or not, extracts the input data IND only if valid, and determines whether the input data IND or reference data has a special value or not (S200). In step S200, when the input data is invalid but adjustable, it may be adjusted, and the adjusted data may be output as valid input data. Further, while not shown, when the valid input data and the reference data are identical and include a specific bit (e.g., a most or least significant bit), a predetermined movement value may be directly output.

In step S200, when the valid input data is extracted, and it or the reference data has no special value, the valid input extractor 21 outputs the valid input data to the operator 22. Then, the operator 22 compares the valid input data with the reference data stored in the reference data storage 24, and operates a movement value, i.e., movement magnitude and movement direction (S300).

When the operation of the movement value is terminated in step S300, or when, as a result of step S200, the valid input data or reference data has the special value, the reference data is changed into the valid input data (S400). Specifically, when the movement value is completely calculated, or when the reference data has the special value (e.g., "0"), the reference data is changed into the valid input data having an arbitrary value. When the valid input data has the special value (e.g., "0"), the reference data is changed into the special value.

In other words, when terminating both operation of the movement magnitude and setting of the movement direction, the operator 22 outputs the valid input data to the reference data storage 24 and the movement magnitude and movement direction to the output unit 25. When the valid input data or the reference data has the special value, the valid input extractor 21 outputs the valid input data to the reference data storage 24.

When the valid input data or the reference data has the special value in step S400, and thereby the reference data is changed, step S200 is performed for the next input data IND again.

When the operation of the movement value is terminated in step S400, and thereby the reference data is changed, the output unit 25 outputs the operated movement value, i.e., movement magnitude and movement direction (S500).

When the movement value is output, step S200 is performed for the next input data IND again.

Figure 5:
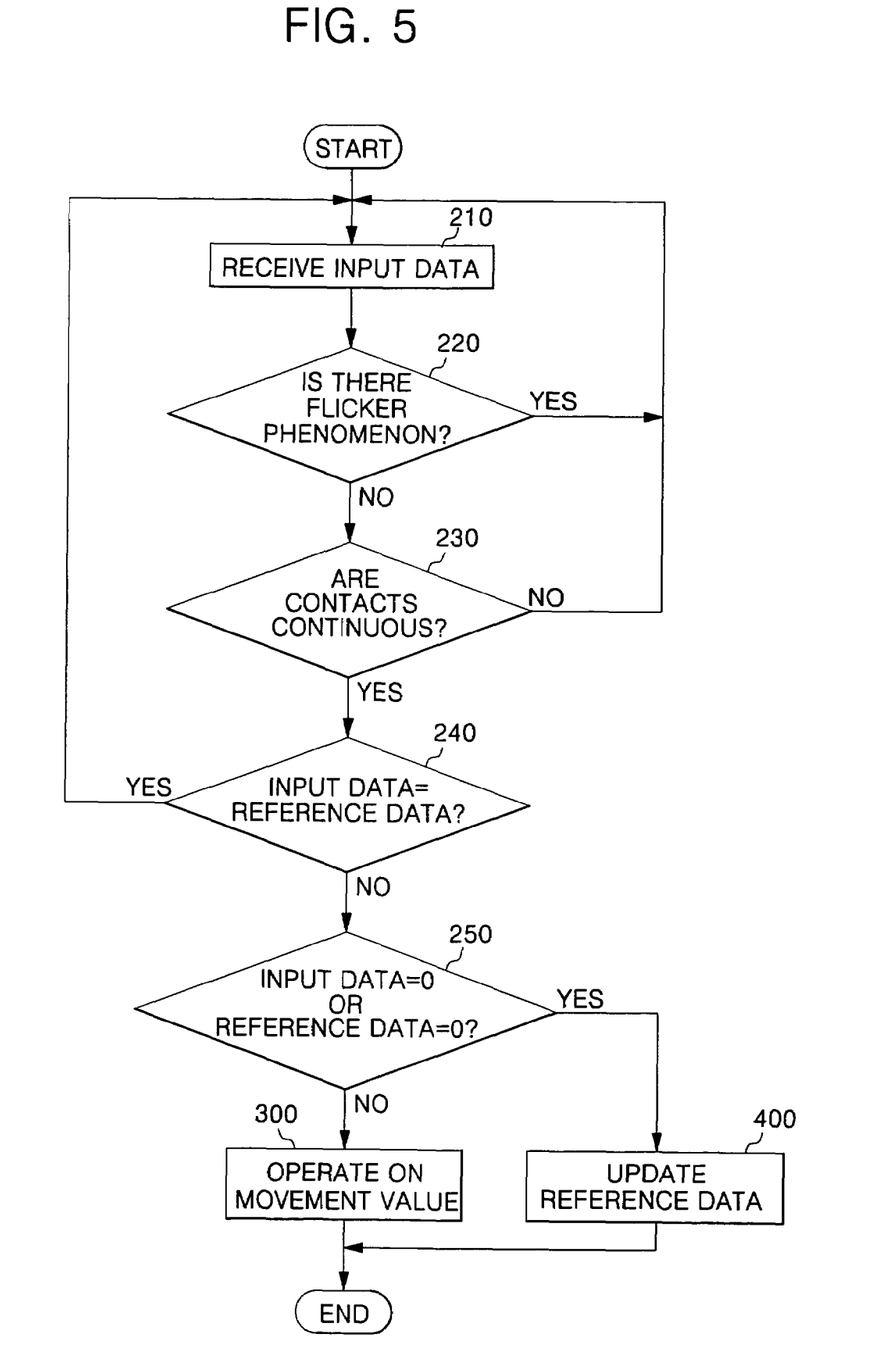
FIG. 5 is a flowchart for explaining a first exemplary embodiment of a step of extracting valid input data in a method for calculating a movement value according to the present invention.

FIG. 5 is a flowchart for explaining a first exemplary embodiment of a step (S200) of extracting valid input data in a method for calculating a movement value according to the present invention.

Referring to FIG. 5, first, input data IND is received (S210).

Next, it is determined whether there is a flicker phenomenon caused by bending of a user's finger or the like (S220). For example, assuming that the input data IND is received n times per second in order to calculate the movement value, only when the input data IND is received m times faster than that. If all of the n×m input data IND are identical, then the input data IND is determined as valid data without any flicker and thus output as the valid input data. If the above condition is not met, the input data IND is determined to have the flicker phenomenon and thus is discarded. In other words, if the flicker phenomenon occurs, the input data IND is received again (S210).

Subsequently, when it is determined in step S220 that no flicker phenomenon occurs, it is determined whether contact is continuous or not (S230). As seen from FIG. 3, each of the touch sensors 10-1, 10-2 . . . 10-8 of the sensing unit 10 outputs "1" when in contact and "0" when out of contact, and thereby the input data IND is output. It is generally impossible for the user to discontinuously contact the touch sensors 10-1, 10-2 . . . 10-8. Here, it is assumed that pad size of the touch sensor is large enough to be insensitive on ridge pattern of fingerprint. For this reason, input data IND having discontinuous "1" bits is determined to be invalid and discarded. Then, the input data IND is received again (S210).

Then, when it is determined in step S230 that the contacts are continuous, it is determined whether the valid input data or the reference data has the special value or not.

First, it is determined whether or not the valid input data is identical to the reference data (S240). If so, this means that the contact of the touch sensors is the same as before. Thus, the current valid input data is discarded, and new input data IND is received (S210).

Next, it is determined whether the valid input data or the reference data has a value of "0" (S250). If the valid input data has a value of "0," this means that all the touch sensors 10-1, 10-2 . . . 10-8 of the sensing unit 10 are out of contact. Thus, the reference data is changed into the current valid input data, namely, a value of "0", without calculating a movement value (S400). However, if the reference data has a value of "0", this means that the current valid input data is generated by initial contact. Thus, in this case as well, the reference data is changed into the current valid input data without calculating the movement value (S400).

Next, when the valid input data or the reference data does not have a special value, i.e., when the valid input data and the reference data are not identical and do not have a value of "0," the movement value is calculated using the valid input data and the reference data (S300).

Even if not shown, it is possible to detect a movement speed through steps S210 to S240. To be specific, when the valid input data is identical to the reference data, the input data is received again. In contrast, when the valid input data is not identical to the reference data, the movement value is calculated using the valid input data that is not identical to the reference data. Thus, by detecting a time from when the valid input data that is not identical to the reference data is input to when valid input data that is not identical to subsequent reference data is input, the movement speed can be detected. Further, this time interval may be detected several times and averaged to detect the movement speed.

Figure 6:
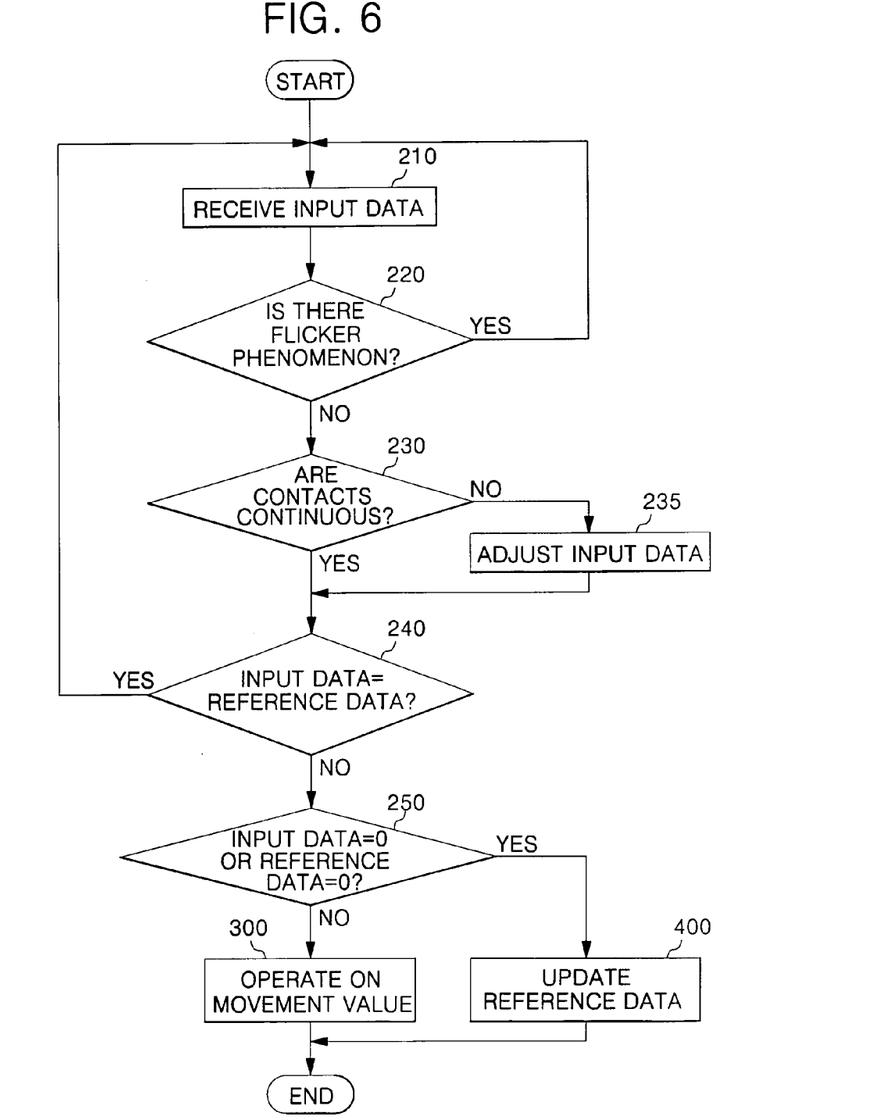
FIG. 6 is a flowchart for explaining a second exemplary embodiment of a step of extracting valid input data in a method for calculating a movement value according to the present invention.

FIG. 6 is a flowchart for explaining a second exemplary embodiment of a step (S200) of extracting valid input data in a method for calculating a movement value according to the present invention.

The second exemplary embodiment of the present invention shown in FIG. 6 is the same as the first exemplary embodiment shown in FIG. 5 except that a step (S235) of adjusting input data is added between steps S230 and S240. Specifically, as a result of step S230, if the contact is not continuous, the input data IND is adjusted to have a continuous value (S235).

Thus, as a result of step S230, if the contact is continuous, the input data IND input is used as the valid input data without any change. However, if the contact is not continuous, step S240 is performed using the input data IND adjusted in step S235 as the valid input data.

Figure 7:
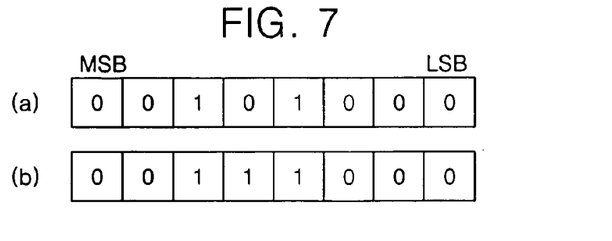
FIG. 7 is a view for explaining a step of adjusting input data IND in the step of extracting valid input data shown in FIG. 6

FIG. 7 is a view for explaining step S235 of adjusting input data IND shown in FIG. 6, wherein (a) shows the input data IND when contacts are not continuous before adjustment, and (b) shows the input data IND after adjustment.

As shown in FIG. 7, if a bit whose value is output as "1" in the input data IND is not continuous, a touch sensor corresponding to a bit interposed between bits having the value "1" is taken to be in contact, and thus the interposing bit is adjusted to "1". Thereby, the input data IND is adjusted to make the "1" bits continuous, and thus the adjusted input data is output as the valid input data.

Figure 8:
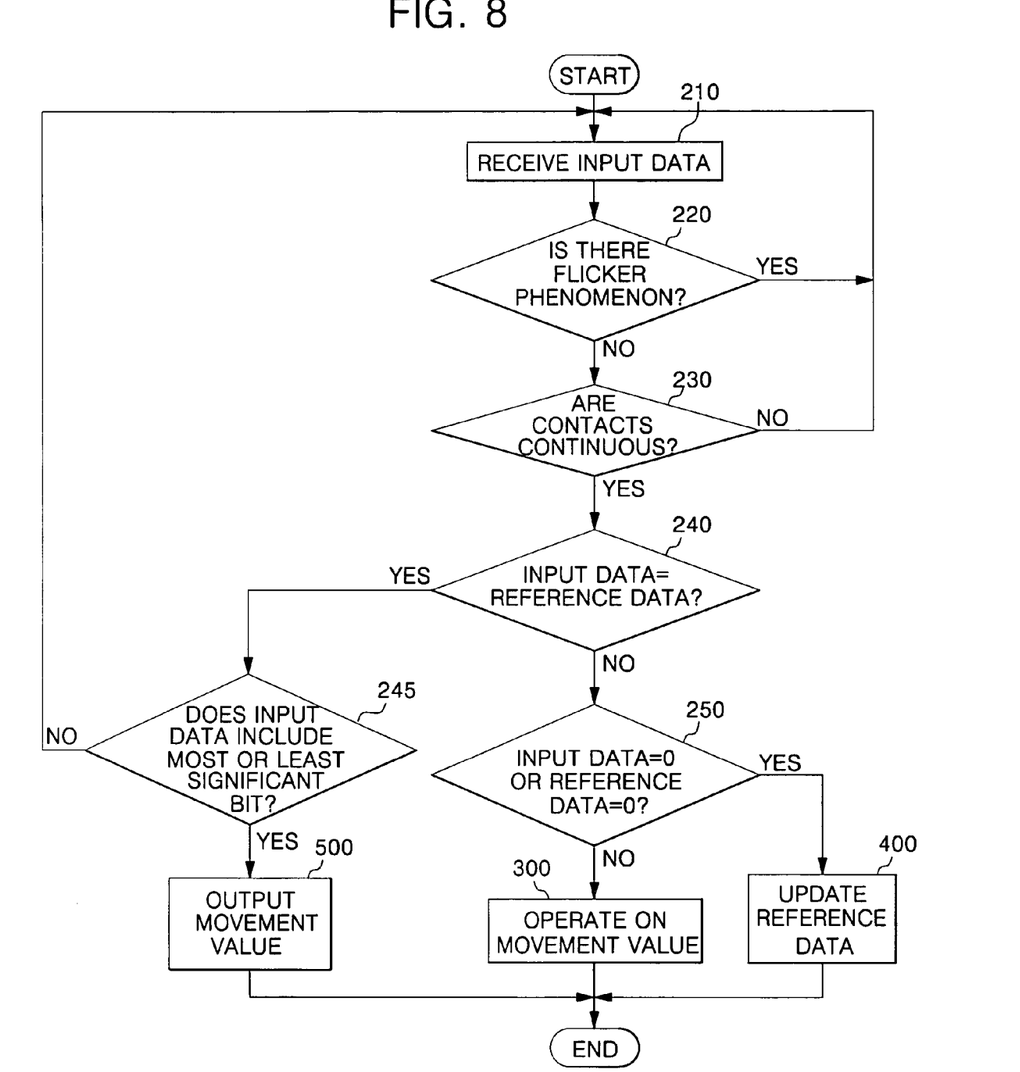
FIG. 8 is a flowchart for explaining a third exemplary embodiment of a step of extracting valid input data in a method for calculating a movement value according to the present invention.

FIG. 8 is a flowchart for explaining a third exemplary embodiment of a step (S200) of extracting valid input data in a method for calculating a movement value according to the present invention.

The third exemplary embodiment of the present invention shown in FIG. 8 is the same as the first exemplary embodiment shown in FIG. 5 except that, as a result of step S240, when the valid input data is identical to the reference data, it is determined whether or not the valid input data includes a most or least significant bit (S245).

To be specific, if the valid input data is identical to the reference data and the valid input data includes the most or least significant bit, a movement value (movement direction and movement magnitude) is output in the same manner as moving up or down with a constant movement magnitude (S500).

Figure 9:
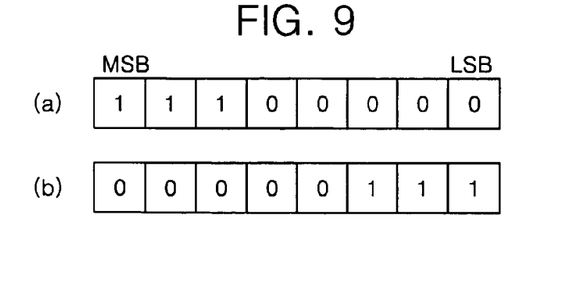
FIG. 9 shows an example where valid input data includes a most or least significant bit.

FIG. 9 shows an example where valid input data includes a most or least significant bit, wherein (a) shows the case where the valid input data includes the most significant bit, and (b) shows the case where the valid input data includes the least significant bit.

As set forth above, when the valid input data is identical to the reference data and includes the most significant bit (MSB) as in FIG. 9(a), a movement value may be output in the same manner as moving up with a constant movement magnitude. In contrast, when the valid input data is identical to the reference data and includes the least significant bit (LSB) as in FIG. 9(b), a movement value may be output in the same manner as moving down with a constant movement magnitude. Alternatively, only when this state where the valid input data is identical to the reference data and includes the MSB or LSB is kept for a predetermined time, the movement value may be output as set forth above.

Figure 10:
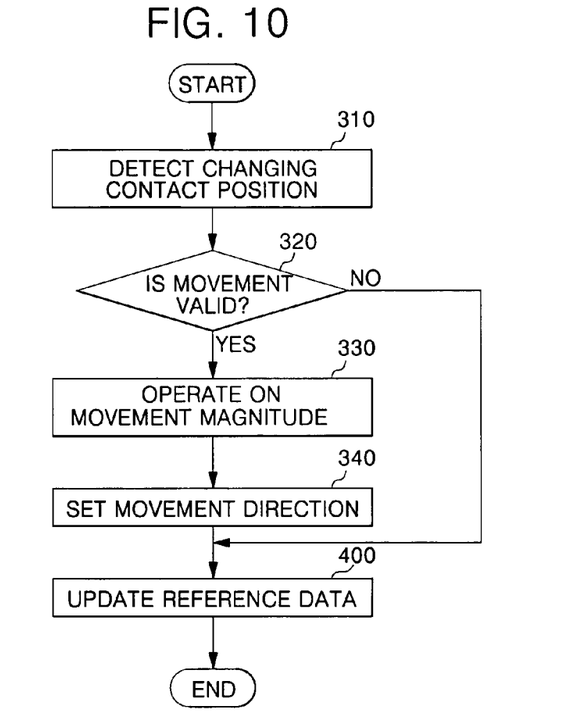
FIG. 10 is a flowchart for explaining a step of operating on a movement value in a method for calculating a movement value according to the present invention.

FIG. 10 is a flowchart for explaining a step of operating on a movement value in a method for calculating the movement value according to the present invention.

Referring to FIG. 10, first, a changing contact position is detected using both valid input data and reference data (S310).

Next, it is determined whether movement is valid or not (S320). In other words, it is determined in which direction the valid input data moves as compared with the reference data. If the valid input data moves in one direction as compared with the reference data, it is determined that the movement is valid. However, if the valid input data moves in opposite directions at the same time, it is determined that the movement is invalid.

As a result of step S320, if the movement is valid, a movement magnitude is operated (S330). At this time, a maximum magnitude is set to prevent excessive movement. When the operated movement magnitude is larger than the set maximum magnitude, the maximum magnitude may be output.

Further, the movement magnitude may be output after multiplication by a predetermined coefficient if necessary. To this end, for example, the movement magnitude changes depending on image resolution as well as a graphics mode.

For example, when selecting an icon on a screen using the human input apparatus of the present invention, the coefficient is determined in proportion to the size of the icon. Thereby, selection of the icon can be made fast and easy. If the icon has a size of 12 by 12 pixels, the coefficient for the operated movement magnitude is determined as 12 or an arbitrary factor of 12, and thereby the icon can be selected in a fast and easy manner. If the number 12 is used as the coefficient, any user can select an adjacent icon by one short movement.

Further, the coefficient may be determined on the basis of a movement speed. To be specific, when the movement speed is high, the coefficient increases, and thereby the magnitude of cursor movement or image scrolling increases proportionally. In contrast, when the movement speed is low, the coefficient decreases, and thereby the magnitude of cursor movement or image scrolling decreases proportionally.

Next, a movement direction is set (S340).

As a result of step S320, if the movement is invalid, or if the movement is valid and thus both the operation of the movement magnitude and the setting of the movement direction are performed, the reference data is changed into current valid input data (S400).

For the above-mentioned step of calculating the movement value (S340), there are two methods: using operated-on data based on comparison of the reference data and the valid input data, and using a point. In the former case, in order to compare reference data and the valid input data, an exclusive OR (XOR) operation is used, which will be described below in detail.

FIGS. 11 to 15 are views for explaining a method for calculating a movement value using an XOR operation, wherein (a) represents reference data, (b) represents current valid input data, and (c) represents operated-on data obtained by performing the XOR operation on the reference data and the current valid input data.

A method for calculating a movement value using an XOR operation will be described below with reference to FIGS. 10 to 15.

First, in step S310 of detecting the changing contact position, reference data shown in (a) of each of FIGS. 11 to 15 (hereinafter, referred to as "reference data (a)") and valid input data shown in (b) of each of FIGS. 11 to 15 (hereinafter, referred to as "valid input data (b)") are subject to an XOR operation. In FIGS. 11 to 15, data obtained from the XOR operation on the reference data (a) and the current valid input data (b) is shown in (c) of each of FIGS. 11 to 15 (hereinafter, referred to as "operated-on data (c)"). In the operated-on data (c), the contact state of a touch sensor corresponding to a bit of "1" changes. In other words, the operated-on data (c) shows a portion where the contact state of the touch sensor changes.

Next, in step S320 of determining whether movement is valid or not, by comparing the operated-on data (c) with the reference data (a), it is determined whether movement is valid or not. Specifically, in the operated-on data (c), when there are two or more "1" bits and none are identical to corresponding bits of the reference data (a) to "1" bit location of the operated-on data (c) are identical, it is determined that the movement is valid. Otherwise it is determined that the movement is invalid.

Figure 11:
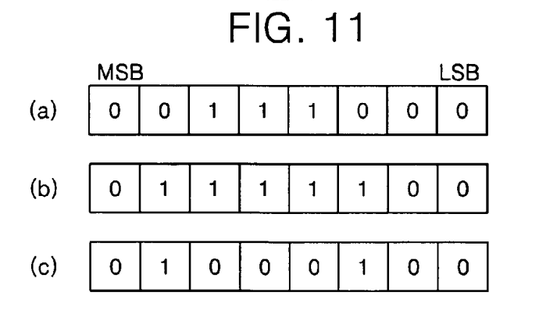
FIG. 11 illustrates invalid movement outward in both directions.
Figure 12:
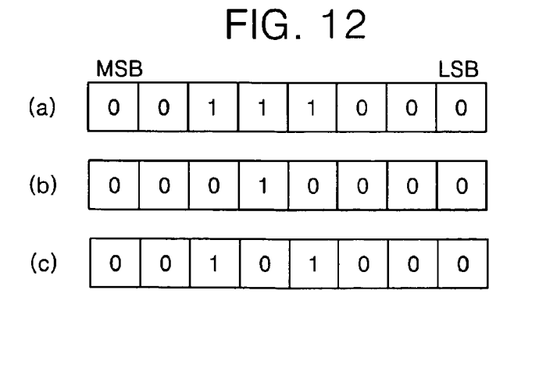
FIG. 12 illustrates invalid movement inward in both directions.

FIGS. 11 and 12 show cases where the movement is invalid. Particularly, FIG. 11 shows a case of moving outward in both directions, while FIG. 12 shows a case of moving inward in both directions.

First, in FIG. 11, all bits of the reference data (a) which correspond to "1" bits of the operated-on data (c) have a value of "0." In FIG. 12, all bits of the reference data (a) which correspond to "1" bits of the operated-on data (c) have a value of "1." In both cases, it is determined in step S320 of FIG. 10 that the movement is invalid, and the method proceeds to step S400 of updating the reference data.

Figure 13:
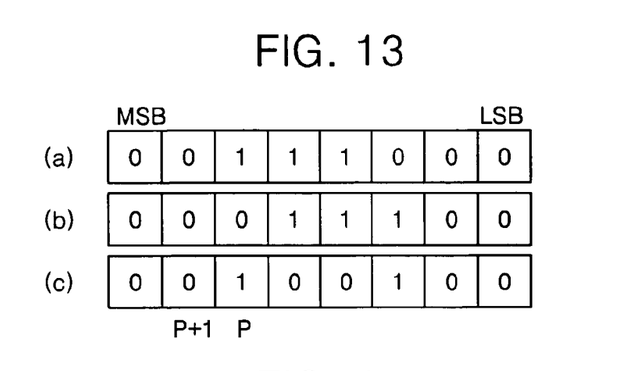
FIG. 13 illustrates valid movement from an upper side (MSB) to a lower side (LSB)
Figure 14:
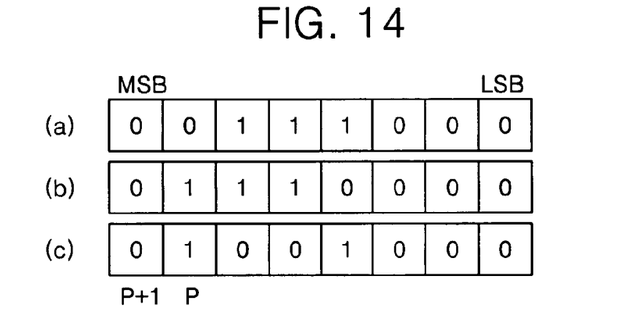
FIG. 14 illustrates valid movement from a lower side (LSB) to an upper side (MSB)
Figure 15:
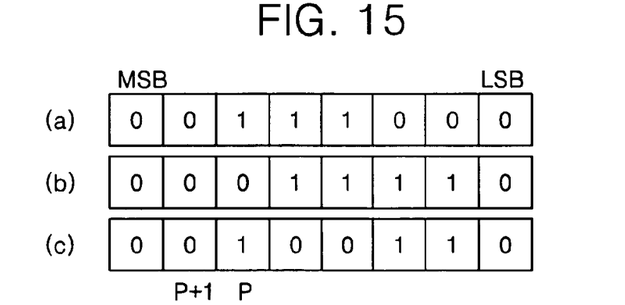
FIG. 15 illustrates valid movement from an upper side (MSB) to a lower side (LSB)

Next, in FIG. 13, the operated-on data (c) has two "1" bits whose corresponding bits of the reference data (a) are "1" and "0". In FIG. 14, the operated-on data (c) has two "1" bits whose corresponding bits of the reference data (a) are "0" and "1". In FIG. 15, the operated-on data (c) has three "1" bits whose corresponding bits of the reference data (a) are "1", "0", and "0". Thus, when the reference data (a) and valid input data (b) are given as in FIGS. 13 to 15, it is determined in step S320 of FIG. 10 that the movement is valid and the movement magnitude is operated by using this (S330).

Now, step S330 of operating on the movement magnitude will be described below with reference to FIGS. 13 to 15 showing valid movements.

When, among the bits of the reference data which correspond to the "1" bits of the operated-on data (c), "0" bits are N in number and "1" bits are M in number, the movement magnitude is determined by comparing N and M. If the movement is to be sensitive, the larger of N and M is set as the movement magnitude. If the movement is to be delicate, the smaller of N and M is set as the movement magnitude. In addition, the average of N and M may be set as the movement magnitude.

Furthermore, as set forth above, in order to prevent excessive movement when setting the movement magnitude, a maximum movement magnitude may be set, and then the calculated movement magnitude may be set so as not to exceed the set maximum movement magnitude. Also, one of N and M may be selected and multiplied by a predetermined coefficient to obtain the movement magnitude.

First, referring to FIG. 13, among the bits of the reference data (a) which correspond to the "1" bits of the operated-on data (c), the number of "0" bits is 1 (N=1) and the number of "1" bits is 1 (M=1), and thus the movement magnitude is 1. This is equally true of the case shown in FIG. 14.

Referring to FIG. 15, among the bits of the reference data (a) which correspond to the "1" bits of the operated-on data (c), the number of "0" bits is 2 (N=2) and the number of "1" bits is 1 (M=1), and thus the movement magnitude is 1, 2, or 1.5.

Now, step S340 of setting the movement direction will be described below with reference to FIGS. 13 to 15.

Hereinafter, it is assumed that the touch sensor corresponding to the MSB of the input data is located at an upper side of the sensing unit 10, while the touch sensor corresponding to the LSB of the input data is located at a lower side of the sensing unit 10. Further, a direction in which a point of contact with the sensing unit 10 (e.g., a user's finger) moves from the upper side (MSB) to the lower side (LSB) is defined as a "+" direction, and the opposite direction of moving from the lower side (LSB) to the upper side (MSB) is defined as a "−" direction.

When two bits of the reference data (a) corresponding to the MSB P and its adjacent higher bit P+1 among the "1" bits of the operated-on data (c) have a different value, the movement direction is set as the "+" direction. When the MSB P of the "1" bits of the operated-on data (c) is the MSB of the operated-on data (c), the bit of the reference data (a) corresponding to the adjacent higher bit P+1 has a value of "0", which is taken as indicating that the touch sensor is out of contact.

First, referring to FIG. 13, it can be seen that positions of the "1" bits of the valid input data (b) are shifted by one bit toward the LSB compared to the "1" bits of the reference data (a). The two bits of the reference data (a) which correspond to the MSB P and the adjacent bit P+1 among the "1" bits of the operated-on data (c) have values of "1" and "0", respectively. Thus, because the two bits have different values, it is determined that the movement direction is the "+" direction, namely from the MSB to the LSB.

Next, referring to FIG. 14 which shows the case of moving in the direction opposite to that of FIG. 13, the two bits of the reference data (a) which correspond to the MSB P and adjacent bit P+1 of the "1" bits of the operated-on data (c) have values of "0" and "0," respectively. Thus, because the two bits have the same value, it is determined that the movement direction is the "−" direction, namely from the LSB to the MSB.

The case of FIG. 13 is the same as that of FIG. 15.

As set forth above, by performing the XOR operation on the reference data and the valid input data and comparing the XOR-operated-on data and the reference data, the movement value, i.e., both movement magnitude and movement direction, can be found.

Figure 16:
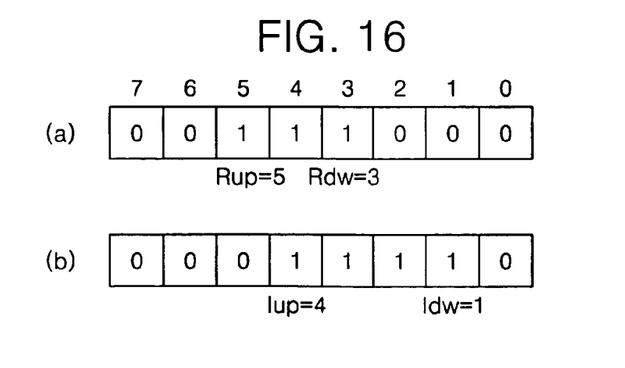
FIG. 16 is a view for explaining a second exemplary embodiment of a step of operating on a movement value in a method for calculating the movement value according to the present invention.

A method of operating on a movement value using a point will now be described with reference to FIGS. 10 and 16. In FIG. 16, (a) shows reference data, and (b) shows valid input data.

In step S310 of detecting the changing contact position, reference data upper and lower points Rup and Rdw that indicate positions of the MSB and LSB of the "1" bits respectively are detected from the reference data (FIG. 16(a)), and input data upper and lower points Iup and Idw that indicate positions of the MSB and LSB of the "1" bits respectively are detected from the valid input data (FIG. 16(b)).

In FIG. 16, the reference data upper point Rup is 5, the reference data lower point Rdw is 3, the input data upper point Iup is 4, and the input data lower point Idw is 1.

Next, in step S320 of determining whether the movement is valid or not, a value n obtained by subtracting the input data upper point Iup from the reference data upper point Rup is calculated and compared with a value m obtained by subtracting the input data lower point Idw from the reference data lower point Rdw. Thereby, it is determined whether the signs of n and m are the same or not. If the signs of n and m are the same, it is determined that the movement is valid. However, if the signs of n and m are not the same, it is determined that the movement is invalid. As set forth above, when it is determined that the movement is invalid, the reference data is changed (S400). In contrast, when it is determined that the movement is valid, the movement magnitude is calculated (S330). If either one of n and m is 0 (zero), it should be determined whether the movement is valid or invalid.

In FIG. 16, n and m are positive values, 1 and 2. Thus, it is determined that the movement is valid.

Subsequently, in step S330 of calculating the movement magnitude, the movement magnitude is calculated by comparing absolute values of n and m. As mentioned above, if the movement is to be sensitive, the larger of the absolute values of n and m is set as the movement magnitude. If the movement is to be delicate, the smaller of the absolute values of n and m is set as the movement magnitude. In addition, the average absolute value of n and m may be set as the movement magnitude.

As set forth above, in this case as well, the calculated movement magnitude may be set so as not to exceed a preset maximum magnitude. Further, the result of multiplying the absolute value of n or m by a predetermined coefficient may be set as the movement magnitude.

In FIG. 16, the movement magnitude may be 2, 1, or 1.5.

Then, in step S340 of setting the movement direction, when n is positive, it is determined that the movement direction is the "+" direction (namely, from the upper side (MSB) to the lower side (LSB)). When n is negative, it is determined that the movement direction is the "−" direction (namely, from the lower side (LSB) to the upper side (MSB)). If it is determined that, when either one of the values of n and m is 0 (zero), the movement is valid, the movement direction is set to be the same as the sign of m when n is 0 (zero).

In FIG. 16, n is positive, and thus the movement direction is set as the "+" direction.

As mentioned above, the reference data upper point Rup, the reference data lower point Rdw, the input data upper point Iup, and the input data lower point Idw are detected from the reference data and the valid input data. And, the movement value, namely the movement magnitude and movement direction, can be determined.

With the human input apparatus with touch sensors and method for calculating a movement value thereof according to the present invention, the movement sensing device mounted on, for example, a mouse in order to scroll through text or images on a screen can replace a mechanical device employing the wheel with an electronic device employing touch sensors. Thus, it is possible not only to prevent malfunction due to noise or abrasion caused by a mechanical switch, but also to reduce power consumption and production cost.

In the human input apparatus with touch sensors and the method for calculating a movement value thereof according to the present invention, the exemplary embodiment of arranging the touch sensors in a row up and down, sensing upward and downward movement, and calculating the movement value has been described as an example. However, a modification in which the touch sensors are arranged in a row from left to right, sensing leftward and rightward movement, and calculating the movement value is also possible. Besides, a modification in which the touch sensors are arranged in a crisscross shape, sensing upward, downward, leftward, and rightward movement, and calculating the movement value is also possible.

Further, the human input apparatus with touch sensors has been described with reference to a mouse as one example, but has a wide range of applications including mobile phones and remote controllers. This is also true of the method for calculating a movement value of the human input apparatus. In which case, a switch used in mobile phones may be replaced by a device employing the touch sensors, and thus durability can be improved.

In addition, the human input apparatus of the present invention makes use of the touch sensors for changing and outputting an output signal by means of direct contact, thus being advantageous for downsizing.

Accordingly, the human input apparatus with touch sensors and the method for calculating a movement value thereof according to the present invention allow the movement sensing device of the human input apparatus to replace the mechanical device with an electronic device, so that it is possible not only to prevent malfunction caused by noise or abrasion of a mechanical switch, but also to reduce power consumption and production cost. Further, the present invention is advantageous from the viewpoint of downsizing.

Although preferred exemplary embodiments of the present invention have been described, it will be understood by those skilled in the art that the present invention should not be limited to the described embodiments. Rather, various changes and modifications can be made within the spirit and scope of the present invention, as defined by the following claims.

What is claimed is:

1. A human input apparatus comprising:
a plurality of touch sensors for varying and outputting output signals by direct contact;
a sensing unit for receiving the output signals in parallel from the plurality of touch sensors and outputting input data in response to the output signals; and
a movement value calculating means for extracting valid input data from the input data and generating an operated-on data comparing the valid input data with a reference data, and operating and outputting a movement value using the reference data and the operated-on data,
wherein the movement value calculating means includes:
a valid input extractor for receiving the input data to determine whether the input data is valid or not and extracting and outputting the valid input data;
a reference data storage for storing the reference data;
a movement value operator for operating on the movement value using the operated-on data and the reference data; and
an output unit for outputting the movement value, and
wherein the valid input extractor adjusts the input data when contact indication bits indicating that the touch sensors are in contact are not continuous in the input data to make the contact indication bits continuous, and outputs the adjusted data as the valid input data.

2. The human input apparatus as claimed in claim 1, wherein the operated-on data is obtained by an exclusive-OR (XOR) operation of the valid input data and the reference data.

3. The human input apparatus as claimed in claim 1, wherein the valid input extractor outputs the input data as the valid input data when the input data does not change for a predetermined time.

4. The human input apparatus as claimed in claim 1, wherein the valid input extractor outputs the input data as the valid input data when the contact indication bits indicating that the touch sensors are in contact are continuous in the input data.

5. The human input apparatus as claimed in claim 1, wherein the valid input extractor outputs the valid input data when the valid input data is not identical to the reference data.

6. The human input apparatus as claimed in claim 1, wherein the movement value calculating means outputs the movement value when the valid input data is identical to the reference data and when the contact indication bits indicating that the touch sensors are in contact include a most or least significant bit in the valid input data, in the same manner as the contact indication bits continue to move in a constant direction.

7. The human input apparatus as claimed in claim 1, wherein the movement value calculating means varies only the reference data into the valid input data without generating the operated-on data or outputting the movement value when either one of the valid input data and the reference data indicates that all of the touch sensors are out of contact.

8. The human input apparatus as claimed in claim 1, wherein the movement value operator performs:

a changing contact position detecting function of performing an exclusive-OR (XOR) operation on the valid input data and the reference data and outputting the operated-on data;
a movement validity determining function of determining that movement is valid when "1" bits of the operated-on data are two or more in number and when all bits of the reference data which correspond to the "1" bits of the operated-on data all are not identical;
a movement magnitude operating function of, when determining that the movement is valid, detecting first and second values that correspond to numbers of "1" and "0" bits respectively among the bits of the reference data which correspond to the "1" bits of the operated-on data, and outputting either one of the first and second values as a movement magnitude; and
a movement direction setting function of setting a movement direction depending on whether or not a first bit that is the bit of the reference data which corresponds to a most significant bit of the "1" bits of the operated-on data has the same value as a second bit that is the bit of the reference data which corresponds to a bit adjacent to the most significant bit of the "1" bits of the operated-on data.

9. The human input apparatus as claimed in claim 8, wherein the movement value operator outputs a predetermined maximum magnitude as the movement magnitude when the movement magnitude is larger than the predetermined maximum magnitude.

10. The human input apparatus as claimed in claim 8, wherein the movement value operator outputs the larger of the first and second values as the movement magnitude.

11. The human input apparatus as claimed in claim 8, wherein the movement value operator outputs the smaller of the first and second values as the movement magnitude.

12. The human input apparatus as claimed in claim 8, wherein the movement value operator determines that the second bit indicates that the touch sensor is out of contact when the most significant bit of the "1" bits of the operated-on data is the most significant bit of the operated-on data, and sets the movement direction.

13. The human input apparatus as claimed in claim 1, wherein the human input apparatus scrolls an image on a screen using the movement value.

14. A human input apparatus comprising:
a plurality of touch sensors for varying and outputting output signals by direct contact;
a sensing unit for receiving the output signals in parallel from the plurality of touch sensors and outputting input data in response to the output signals; and
a movement value calculating means for extracting valid input data from the input data and calculating and outputting a movement value using input data upper and lower points that are most and least significant bits of the valid input data indicating that the touch sensors are in contact and reference data upper and lower points that are most and least significant bits of the reference data indicating that the touch sensors are in contact,
wherein the movement value calculating means includes:
a valid input extractor for receiving the input data to determine whether the input data is valid or not, and extracting and outputting the valid input data;
a reference data storage for storing the reference data;
a movement value operator for operating on the movement value using the input data upper point, the input data lower point, the reference data upper point, and the reference data lower point; and
an output unit for outputting the movement value, and wherein the valid input extractor outputs the input data as the valid input data when the input data does not change for a predetermined time.

15. The human input apparatus as claimed in claim 14, wherein the valid input extractor outputs the input data as the valid input data when contact indication bits indicating that the touch sensors are in contact are continuous in the input data.

16. The human input apparatus as claimed in claim 14, wherein the valid input extractor adjusts the input data when contact indication bits indicating that the touch sensors are in contact are not continuous in the input data to make the contact indication bits continuous, and outputs the adjusted data as the valid input data.

17. The human input apparatus as claimed in claim 14, wherein the valid input extractor outputs the valid input data when the valid input data is not identical to the reference data.

18. The human input apparatus as claimed in claim 14, wherein the movement value calculating means outputs the movement value when the valid input data is identical to the reference data and when contact indication bits indicating that the touch sensors are in contact include the most or least significant bit in the valid input data, in the same manner as the contact indication bits continue to move in a constant direction.

19. The human input apparatus as claimed in claim 14, wherein the movement value calculating means varies only the reference data into the valid input data without operating on or outputting the movement value when either one of the valid input data and the reference data indicates that all the touch sensors are out of contact.

20. The human input apparatus as claimed in claim 14, wherein the movement value operator performs:
 a changing contact position detecting function of detecting the input data upper point, the input data lower point, the reference data upper point and the reference data lower point;
 a movement validity determining function of calculating a first value of subtracting the input data upper point from the reference data upper point and a second value of subtracting the input data lower point from the reference data lower point and determining that movement is valid when signs of the first and second values are not different from each other;
 a movement magnitude operating function of outputting either one of an absolute value of the first value and an absolute value of the second value as a movement magnitude; and
 a movement direction setting function of setting a movement direction depending on the sign of the first value.

21. The human input apparatus as claimed in claim 20, wherein the movement value operator outputs a predetermined maximum magnitude as the movement magnitude when the movement magnitude is larger than the predetermined maximum magnitude.

22. The human input apparatus as claimed in claim 20, wherein the movement value operator outputs the larger of the absolute values of the first and second values as the movement magnitude.

23. The human input apparatus as claimed in claim 20, wherein the movement value operator outputs the smaller of the absolute values of the first and second values as the movement magnitude.

24. The human input apparatus as claimed in claim 20, wherein the movement value operator sets the movement direction depending on the sign of the second value when the first value is 0.

25. The human input apparatus as claimed in claim 14, wherein the human input apparatus scrolls an image on a screen using the movement value.

26. A method for calculating a movement value of a human input apparatus including a plurality of touch sensors for varying and outputting output signals by direct contact, and a sensing unit for receiving the output signals in parallel from the plurality of touch sensors and outputting input data in response to the output signals, the method comprising:
 a valid input data extracting step of receiving the input data to determine whether or not the input data is valid and outputting valid input data;
 a movement value operating step of operating on the movement value using operated-on data comparing the valid input data with a reference data;
 a reference data changing step of changing the reference data into the valid input data; and
 a movement value outputting step of outputting the movement value,
 wherein the valid input data extracting step adjusts the input data when contact indication bits indicating that the touch sensors are in contact are not continuous in the input data to make the contact indication bits continuous, and outputs the adjusted data as the valid input data.

27. The method as claimed in claim 26, wherein the operated-on data is obtained by an exclusive-OR (XOR) operation of the valid input data and the reference data.

28. The method as claimed in claim 26, wherein the valid input data extracting step outputs the input data as the valid input data when the input data does not change for a predetermined time.

29. The method as claimed in claim 26, wherein the valid input data extracting step outputs the input data as the valid input data when the contact indication bits indicating that the touch sensors are in contact are continuous in the input data.

30. The method as claimed in claim 26, wherein the valid input data extracting step outputs the valid input data when the valid input data is not identical to the reference data.

31. The method as claimed in claim 26, wherein the method for calculating the movement value outputs the movement value when the valid input data is identical to the reference data and when the contact indication bits indicating that the touch sensors are in contact include a most or least significant bit in the valid input data, in the same manner as the contact indication bits continue to move in a constant direction.

32. The method as claimed in claim 26, wherein the method for calculating the movement value performs only the reference data changing step without performing the movement value operating step and the movement value outputting step when either one of the valid input data and the reference data indicates that all the touch sensors are out of contact.

33. The method as claimed in claim 26, wherein the movement value operating step includes:
 a changing contact position detecting sub-step of performing an exclusive-OR (XOR) operation on the valid input data and the reference data and outputting the operated-on data;
 a movement validity determining sub-step of determining that movement is valid when "1" bits of the operated-on data are two or more in number and when all bits of the reference data which correspond to the "1" bits of the operated-on data all are not identical;
 a movement magnitude operating sub-step of, when determining that the movement is valid, detecting first and second values that correspond to numbers of "1" and "0" bits respectively among the bits of the reference data which correspond to the "1" bits of the operated-on data, and outputting either one of the first and second values as a movement magnitude; and
 a movement direction setting sub-step of setting a movement direction depending on whether or not a first bit that is the bit of the reference data which corresponds to a most significant bit of the "1" bits of the operated-on data has the same value as a second bit that is the bit of the reference data which corresponds to a bit adjacent to the most significant bit of the "1" bits of the operated-on data.

34. The method as claimed in claim 33, wherein the movement magnitude operating sub-step outputs a predetermined maximum magnitude as the movement magnitude when the movement magnitude is larger than the predetermined maximum magnitude.

35. The method as claimed in claim 33, wherein the movement magnitude operating sub-step outputs the result of multiplying the movement magnitude by a predetermined coefficient.

36. The method as claimed in claim 35, wherein the coefficient is a number obtained by dividing a pixel number for a size of an icon on a screen by an integer.

37. The method as claimed in claim 35, further comprising a movement speed sensing step of measuring a time until the valid input data changes and sensing a movement speed,
wherein the coefficient is set in proportion to the movement speed.

38. The method as claimed in claim 33, wherein the movement magnitude operating sub-step outputs the larger of the first and second values as the movement magnitude.

39. The method as claimed in claim 33, wherein the movement magnitude operating sub-step outputs the smaller of the first and second values as the movement magnitude.

40. The method as claimed in claim 33, wherein the movement direction setting sub-step determines that the second bit indicates that the touch sensor is out of contact when the most significant bit of the "1" bits of the operated-on data is the most significant bit of the operated-on data, and sets the movement direction.

41. A method for calculating a movement value of a human input apparatus including a plurality of touch sensors for varying and outputting output signals by direct contact and a sensing unit for receiving the output signals in parallel from the plurality of touch sensors and outputting input data in response to the output signals, the method comprising:
a valid input data extracting step of receiving the input data to determine whether or not the input data is valid and outputting valid input data;
a movement value operating step of operating on the movement value from input data upper and lower points that are most and least significant bits of the valid input data indicating that the touch sensors are in contact and from reference data upper and lower points that are most and least significant bits of the reference data indicating that the touch sensors are in contact;
a reference data changing step of changing the reference data into the valid input data; and
a movement value outputting step of outputting the movement value,
wherein the valid input data extracting step adjusts the input data when contact indication bits indicating that the touch sensors are in contact are not continuous in the input data to make the contact indication bits continuous, and outputs the adjusted data as the valid input data.

42. The method as claimed in claim 41, wherein the valid input data extracting step outputs the input data as the valid input data when the input data does not change for a predetermined time.

43. The method as claimed in claim 41, wherein the valid input data extracting step outputs the input data as the valid input data when the contact indication bits indicating that the touch sensors are in contact are continuous in the input data.

44. The method as claimed in claim 41, wherein the valid input data extracting step outputs the valid input data when the valid input data is not identical to the reference data.

45. The method as claimed in claim 41, wherein the method for calculating the movement value outputs the movement value when the valid input data is identical to the reference data and when the contact indication bits indicating that the touch sensors are in contact include the most or least significant bit in the valid input data, in the same manner as the contact indication bits continue to move in a constant direction.

46. The method as claimed in claim 41, wherein the method for calculating the movement value performs only the reference data changing step without performing the movement value operating step and the movement value outputting step when either one of the valid input data and the reference data indicates that all the touch sensors are out of contact.

47. The method as claimed in claim 41, wherein the movement value operating step includes:
a changing contact position detecting sub-step of detecting the input data upper point, the input data lower point, the reference data upper point and the reference data lower point;
a movement validity determining sub-step of calculating a first value of subtracting the input data upper point from the reference data upper point and a second value of subtracting the input data lower point from the reference data lower point and determining that movement is valid when signs of the first and second values are not different from each other;
a movement magnitude operating sub-step of outputting either one of an absolute value of the first value and an absolute value of the second value as a movement magnitude; and
a movement direction setting sub-step of setting a movement direction depending on the sign of the first value.

48. The method as claimed in claim 47, wherein the movement magnitude operating sub-step outputs a predetermined maximum magnitude as the movement magnitude when the movement magnitude is larger than the predetermined maximum magnitude.

49. The method as claimed in claim 47, wherein the movement magnitude operating sub-step outputs the result of multiplying the movement magnitude by a predetermined coefficient.

50. The method as claimed in claim 49, wherein the coefficient is a number obtained by dividing a pixel number for a size of an icon on a screen by an integer.

51. The method as claimed in claim 49, further comprising a movement speed sensing step of measuring a time until the valid input data changes and sensing a movement speed,
wherein the coefficient is set in proportion to the movement speed.

52. The method as claimed in claim 47, wherein the movement magnitude operating sub-step outputs the larger of the absolute values of the first and second values as the movement magnitude.

53. The method as claimed in claim 47, wherein the movement magnitude operating sub-step outputs the smaller of the absolute values of the first and second values as the movement magnitude.

54. The method as claimed in claim 47, wherein the movement direction setting sub-step sets the movement direction depending on the sign of the second value when the first value is 0.

* * * * *